(12) United States Patent
Messere et al.

(10) Patent No.: US 10,989,975 B2
(45) Date of Patent: Apr. 27, 2021

(54) ELECTROCHROMIC COMPONENTS AND METHODS ASSOCIATED THEREWITH

(71) Applicant: SAGE ELECTROCHROMICS, INC., Faribault, MN (US)

(72) Inventors: Rino Messere, Modave (BE); Pascal Reutler, Edina, MN (US); Bryan D. Greer, Northfield, MN (US); Jean-Christophe Giron, Edina, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 113 days.

(21) Appl. No.: 15/349,577

(22) Filed: Nov. 11, 2016

(65) Prior Publication Data

US 2017/0139301 A1 May 18, 2017

Related U.S. Application Data

(60) Provisional application No. 62/255,167, filed on Nov. 13, 2015.

(51) Int. Cl.
*G02F 1/153* (2006.01)
*G02F 1/157* (2006.01)
(Continued)

(52) U.S. Cl.
CPC .............. *G02F 1/157* (2013.01); *G02B 1/10* (2013.01); *G02B 5/003* (2013.01); *G02F 1/155* (2013.01);
(Continued)

(58) Field of Classification Search
CPC .... G02F 1/1334; G02F 1/1335; G02F 1/1347; G02F 1/15; G02F 1/1508; G02F 1/1515; G02F 1/1519; G02F 1/1523; G02F 1/153; G02F 1/155; G02F 1/1552; G02F 1/1555; G02F 1/1557; G02F 1/157; G02F 1/163; G02F 2001/1555; G02F 2001/1557; G02F 2202/12; G02B 1/10; G02B 1/11;
(Continued)

(56) References Cited

U.S. PATENT DOCUMENTS 6,160,655 A 12/2000 Fix et al.
6,441,942 B1 8/2002 Branz et al.
(Continued)

FOREIGN PATENT DOCUMENTS

JP 2007520752 A 7/2007

OTHER PUBLICATIONS

International Search Report and Written Opinion for International Application PCT/US2016/061516 dated Feb. 16, 2017, 16 pages.

*Primary Examiner* — James C. Jones
(74) *Attorney, Agent, or Firm* — Abel Schillinger, LLP; Robert N. Young

(57) ABSTRACT

A glazing including an electrochromic component and a coating coupled to the electrochromic component. In an embodiment the coating includes a non-transparent element. In a further embodiment, the non-transparent element includes a plurality of non-transparent elements. In another aspect, a method of displaying an image includes providing an electrochromic component and a coating coupled to the electrochromic component and projecting the image onto the coating from a light emitting source.

20 Claims, 4 Drawing Sheets

(51) Int. Cl.
*G02B 1/10* (2015.01)
*G02B 5/00* (2006.01)
*G02F 1/155* (2006.01)
*G03B 21/62* (2014.01)

(52) U.S. Cl.
CPC ...... *G03B 21/62* (2013.01); *G02F 2001/1555* (2013.01)

(58) Field of Classification Search
CPC ........ G02B 5/003; G03B 21/28; G03B 21/56; G03B 21/60; G03B 21/62; G09G 3/2003; G09G 3/34; G09G 3/344; G09G 3/3453; B29C 64/00; B32B 17/10; B32B 17/10036; B32B 17/10174; B32B 17/10513; B32B 17/10247; B32B 17/10339; B32B 17/10504; B32B 17/10541; B32B 17/10743; B32B 17/10761; B32B 38/14; B32B 2367/00; B41M 3/003; B41M 5/0047; B44F 1/06; B60R 1/088; B60J 3/04; C03C 17/007; C03C 17/34; C03C 17/36; C03C 17/3657; C03C 17/3681; C03C 2217/475; C03C 2217/72; C03C 2218/01

USPC ....... 359/265, 267, 269, 270, 273, 274, 275, 359/443, 601, 614, 883; 345/105, 84; 349/16; 427/108, 126.2, 165, 266, 287, 427/389.7, 407.2; 52/171.3, 786.1, 52/786.11

See application file for complete search history.

(56) References Cited

U.S. PATENT DOCUMENTS

| | | |
|---|---|---|
| 7,649,668 B2 | 1/2010 | Xavier et al. |
| 2003/0192263 A1 | 10/2003 | Kasinger et al. |
| 2006/0248768 A1 | 11/2006 | Dell et al. |
| 2012/0033287 A1 | 2/2012 | Friedman et al. |
| 2013/0335716 A1* | 12/2013 | Shields ............... B44F 1/10 353/99 |
| 2014/0104667 A1* | 4/2014 | Greer ............... G02F 1/163 359/275 |
| 2014/0133005 A1* | 5/2014 | Sbar ............... B32B 17/10513 359/265 |

* cited by examiner

ELECTROCHROMIC COMPONENTS AND METHODS ASSOCIATED THEREWITH

CROSS-REFERENCE TO RELATED APPLICATION(S)

This application claims priority under 35 U.S.C. § 119(e) to U.S. Patent Application No. 62/255,167 entitled "ELECTROCHROMIC COMPONENTS AND METHODS ASSOCIATED THEREWITH," by Rino Messere, Pascal Reutler, Bryan D. Greer and Jean-Christophe Giron, filed Nov. 13, 2015, which is assigned to the current assignee hereof and incorporated herein by reference in its entirety.

FIELD OF THE DISCLOSURE

The present disclosure relates to electrochromic components and other transparent or translucent substrates including coatings.

RELATED ART

As space has become limited with growing population, buildings and work spaces have become significantly more crowded, making multi-use devices more valuable. Both interior and exterior surfaces of buildings are generally unusable spaces inadequate for multiple different uses.

Industries associated with buildings and structures continue to demand improved ways of incorporating components for multiple different uses.

BRIEF DESCRIPTION OF THE DRAWINGS

Embodiments are illustrated by way of example and are not intended to be limited in the accompanying figures.

Figure 1:
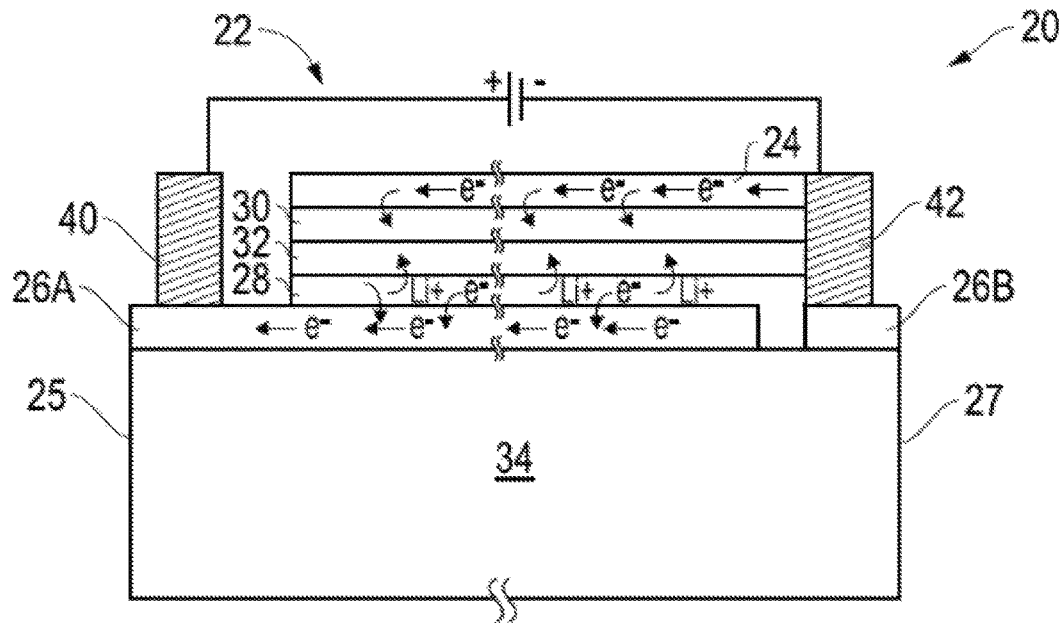
FIG. 1 includes a cross-sectional view of an electrochromic component in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass and electrochromic arts.

In accordance with an embodiment, a system can generally include a unit and a light emitting source adapted to project an image toward the unit. The unit may include a transparent or translucent substrate and a coating coupled thereto. The coating may include a non-transparent element, such as a plurality of non-transparent elements, disposed along a major surface of the substrate. In an embodiment, at least two of the plurality of non-transparent elements may be the same size, have the same spectral properties (e.g., reflectivity, hue, etc.), or have a combination of features which are the same as each other. In certain embodiments, the substrate may include an insulated glass unit (IGU) such as an electrochromic glazing. In other embodiments, the substrate may include a laminate having multiple layers coupled together.

The system may permit projection of an image onto the unit while simultaneously allowing sufficient ambient light to pass through the unit, thereby allowing viewing of the image on a first side of the unit and light passage through the unit to a second side thereof. For example, in a particular embodiment, the system may be part of a building (e.g., a glass façade). A light emitting source, such as a projector, can project an image onto a glass surface of the building such that the image is visible to people outside of the building. Meanwhile, those people within the building may observe sufficient passage of ambient light through the glass façade to naturally illuminate the building's interior space.

FIG. 1 illustrates an electrochromic component 20 in accordance with an embodiment. The electrochromic component 20 may include isolated transparent conductive layer regions 26A and 26B, a counter electrode layer 28, a solid ion conductive layer 32, an electrochromic layer 30 and a transparent conductive layer 24. The layers 26, including regions 26A and 26B, 28, 30, 32, and 24 can be vapor deposited. In another embodiment, the relative positions of the electrochromic layer 30 and the counter electrode layer 28 may be interchanged. Further, the component 20 can includes a bus bar 40 which is in contact only with the conductive layer region 26A, and a bus bar 42 which may be formed on the conductive layer region 26B and is in contact with the conductive layer 24. The bus bars 40 and 42 can be formed by printing a conductive ink or using another technique. The voltage source 22 and wires connected to the bus bars 40 and 42 may or may not be part of the panel.

When the voltage source 22 is operated to apply an electrical potential across the bus bars 40, 42, electrons, and thus a current, flows from the bus bar 42, across the transparent conductive layer 24 and into the electrochromic layer 30. Further, ions flow from the counter electrode layer 28, through the ion conductive layer 32, and to the electrochromic layer 30, and a charge balance is maintained by electrons being extracted from the counter electrode layer 28, and then being inserted into the electrochromic layer 30 via the external circuit. The above-described electrochromic component may be a solid state device.

In the tinted state, ambient light may be at least partially prevented from passing through the component 20. In the bleached state, ambient light may generally pass through the component 20, for example, to illuminate an interior space of a building.

Figure 2:
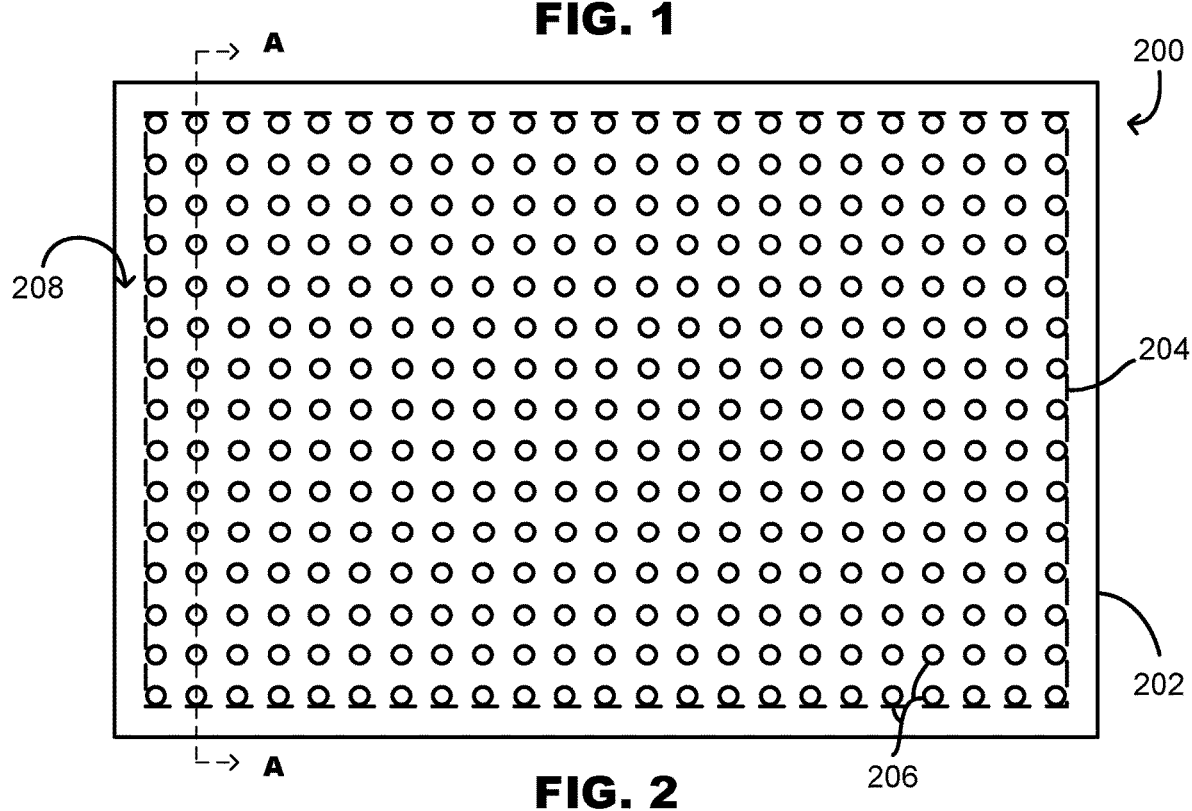
FIG. 2 includes a front view of a system including an electrochromic component or substrate and a coating in accordance with an embodiment.

Referring to FIG. 2, a system 200 in accordance with one or more of the embodiments described herein may generally include a substrate 202 and a coating 204 coupled to the substrate 202. The substrate 202 may include, for example, an IGU or another suitable layered structure, such as a laminate. In a particular embodiment, the substrate 202 may include an electrochromic component. In an embodiment, the substrate 202 may be planar, or generally planar, lying along, or approximately along, a plane. As used herein, "generally planar" refers to a surface which deviates from a plane at any given location by no greater than 100 mm, no greater than 50 mm, or no greater than 10 mm. In other embodiments, the substrate 202 may be curved, convex, concave, undulating, or otherwise deviate from a planar configuration. In a particular embodiment, certain portions of the substrate 202 may be planar while other portions thereof undulate or deviate from planarity.

Coating 204 may be coupled to the substrate 202 and cover at least 10% of a visible surface area, $A_S$, of the substrate 202, such as at least 15% of the surface area of the substrate 202, at least 20% of the surface area of the substrate 202, at least 25% of the surface area of the substrate 202, at least 50% of the surface area of the substrate 202, at least 75% of the surface area of the substrate 202, or even at least 90% of the surface area of the substrate 202. In an embodiment, the coating 204 may cover no greater than 99% of the surface area of the substrate 202, no greater than 98% of the surface area of the substrate 202, no greater than 97% of the surface area of the substrate 202, no greater than 96% of the surface area of the substrate 202, or no greater than 95% of the surface area of the substrate 202. In a particular embodiment, the coating 204 may cover the entire surface are of the substrate 202.

In an embodiment, the coating 204 may include a plurality of non-transparent elements 206 interspaced along a major surface 208 of the substrate 202. The non-transparent elements 206 may include those portions of the coating 204 which are disposed on the substrate 202, each mitigating passage of at least 5% ambient light, such as at least 10% ambient light, at least 25% ambient light, at least 50% ambient light, or at least 75% ambient light. In a particular instance, the non-transparent elements 206 are not required to entirely prevent transmission of ambient light therethrough. In another instance, the non-transparent elements 206 need only be capable of reflecting a projected light.

In a particular embodiment, the non-transparent elements 206 may include ceramics, polymers, metals, alloys, or combinations thereof. In an embodiment, at least one of the non-transparent elements 206 may include an enamel, such as a vitreous enamel, formed into elements 206 prior to application along substrate 202, and applied using an additive manufacturing process, such as screen printing or ink-jet printing. The non-transparent elements 206 may be formed from frit, powder, pigments, dyes, additives, liquids, semi-liquid materials, and combinations thereof, mixed together at particular weight percentages to obtain a desirable material characteristic. The materials may be mixed, for example, using a propeller mixer or a rotating drum, until desirable homogeneity is reached, at which time the material can be shaped into bodies of desirable shape and size. The bodies can then be cured, for example, by baking, and applied to a substrate for screen printing.

In another embodiment, the coating 204 may include a material with transparent portions and non-transparent portions. For example, referring to FIG. 7, the coating 204 may include a sheet 702 formed from a first material, and elements 704 along the sheet 702 which are formed from a second material, where the first and second materials are different from one another. In an embodiment, the first material can be glass or a polymer, such as polyethylene terephthalate (PET), polyvinyl butyral (PVB), poly(methyl methacrylate) (PMMA), polycarbazole, another similar material, or a combination thereof. The elements 704 may be integrally formed with the sheet 702 or attached thereto at desired locations. The elements 704 may be non-transparent, or semi-non-transparent, such that at least a portion of light projected thereon reflects to form a portion of an image for display.

Figure 3:
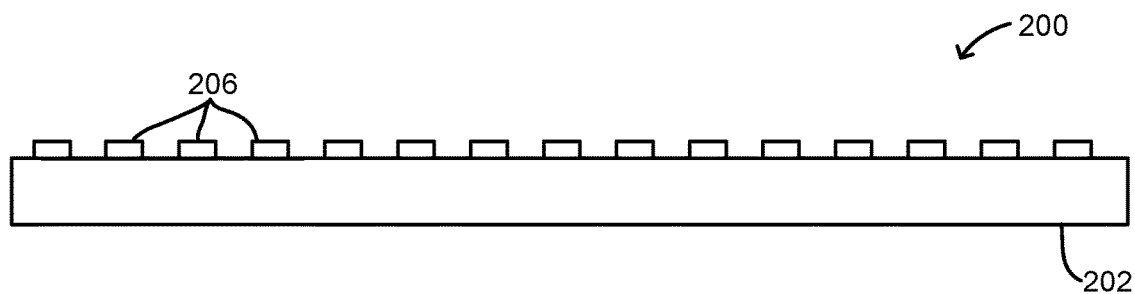
FIG. 3 includes a cross-sectional side view of the system of FIG. 2 as viewed along Line A-A.

FIG. 3 illustrates a cross-sectional side elevation view of the system 200 as viewed along Line A-A in FIG. 2. The non-transparent elements 206 may be coupled to the substrate 202. In an embodiment, the non-transparent elements 206 may be directly coupled to the substrate 202. That is, the system 200 may be essentially free of intermediary layers or compositions, allowing direct contact between the non-transparent elements 206 and the substrate 202.

In another embodiment, the system 200 may include an adhesive, an adhesion promoting layer, or a combination thereof disposed between the non-transparent elements 206 and the substrate 202. In a particular instance, the adhesive may include a hot melt adhesive. In another instance, the adhesive may include a same material as the non-transparent elements 206 melted or otherwise liquefied to promote adhesion of the non-transparent elements 206 to the substrate 202. The adhesion promoting layer may include, for example, a primer, applied to the substrate 202 prior to screen printing. The primer may contain an evaporating solvent which may alter the state or temperature of the substrate 202 for effective application of non-transparent elements 206. One or more light treatments (e.g, ultraviolet light exposure) may be performed to further clean the substrate 202 and check quality of the substrate 202 for adhesion.

In an embodiment, at least one of the non-transparent elements 206 can have an arcuate profile, such as a circular profile, an ovular profile, or any other suitable arcuate profile, as viewed perpendicular to a major surface of the substrate 202 after installation of the coating 204 on the substrate 202. In another embodiment, at least one of the non-transparent elements 206 can have a polygonal profile, as viewed perpendicular to the major surface of the substrate 202 after installation of the coating 204 on the substrate 202. In yet a further embodiment, at least one of the non-transparent elements 206 can have arcuate portions and polygonal portions, as viewed perpendicular to the major surface of the substrate 202 after installation of the coating 204 on the substrate 202.

Figure 4:
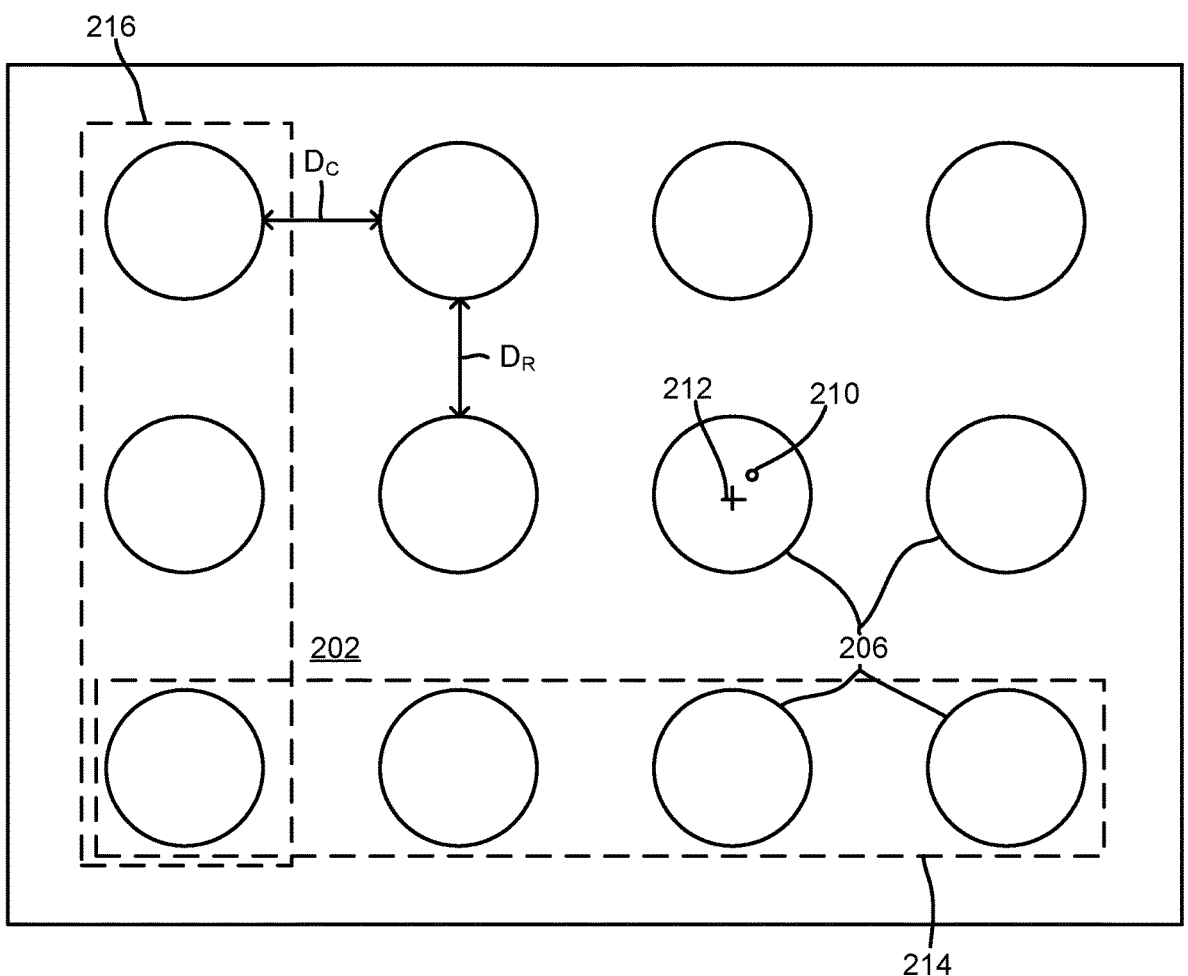
FIG. 4 includes an enlarged front view of the system in accordance with an embodiment.

In an embodiment, at least one of the non-transparent elements 206 may have a polygonal cross section as viewed parallel to a major surface of the substrate 202 after installation of the coating 204 on the substrate 202. For example, as illustrated in FIG. 3, at least one of the non-transparent elements 206, such as all of the transparent elements 206, can have a rectangular cross-sectional profile. In another embodiment, at least one of the non-transparent elements 206, such as all of the transparent elements 206, can have a cross-sectional profile selected from a pentagon, a hexagon, a heptagon, an octagon, a nonagon, a decagon, any other suitable polygonal shape, or a combination thereof. In an embodiment, at least one of the non-transparent elements 206, such as all of the transparent elements 206, can have an arcuate cross-sectional profile or portion. For example, the non-transparent element 206 can include an arcuate surface with two nodes extending from a location adjacent to the substrate 202 toward an apex. In a particular instance, the apex may be at a central portion of the non-transparent element 206. In another instance, the apex may be displaced from the center of the non-transparent element 206 by a distance. For example, referring to FIG. 4, the apex 210 of at least one of the non-transparent elements 206 may be displaced from center 212.

In an embodiment, at least one of the non-transparent elements 206 has a largest dimension of at least 0.4 mm, at least 0.5 mm, at least 0.6 mm, at least 0.7 mm, at least 0.8 mm, at least 0.9 mm, at least 1 mm, at least 1.1 mm, at least 1.2 mm, or at least 1.3 mm. In a particular instance, the largest dimension may extend parallel with the substrate 202 such that the largest dimension is visible when viewed perpendicular to the substrate 202. In another embodiment, at least one of the non-transparent elements 206 can have a largest dimension of no greater than 100 mm, no greater than 90 mm, no greater than 80 mm, no greater than 70 mm, no greater than 60 mm, no greater than 50 mm, no greater than 40 mm, no greater than 30 mm, no greater than 20 mm, no greater than 10 mm, or no greater than 5 mm. In an embodiment, the largest dimension of at least one of the non-transparent elements 206 can be in a range between and including 0.4 mm and 100 mm, such as in a range between and including 0.9 mm and 10 mm, in a range between and including 1 mm and 2 mm, or in a range between and including 1.2 mm and 1.5 mm.

The non-transparent elements 206 may be spaced apart from one another. In an embodiment, the system 200 may include a matrix of non-transparent elements 206 including rows 214 and columns 216 of non-transparent elements 206 arranged along the substrate 202. In an embodiment, distances, $D_R$, between adjacent rows 214 may be the same for all adjacent rows 214 along the substrate 202. Similarly, in an embodiment, distances, $D_C$, between adjacent columns 216 may be the same across for all adjacent columns 216 the substrate 202. In a particular instance, uniform distances, $D_R$ or $D_C$, may permit uniform image resolution along the system 200 where all points along the substrate 202 have substantially equal pixilation. That is, images projected onto the coating 202 may be uniformly represented by an equal pixilation.

In a particular embodiment, a nearest distance between two non-transparent elements 206 is at least 0.05 mm, at least 0.1 mm, or at least 0.25 mm. In another embodiment, a nearest distance between two non-transparent elements 206 can be no greater than 1000 mm, no greater than 100 mm, no greater than 10 mm, or no greater than 1 mm. The distance between apexes 210 of adjacent non-transparent elements 206 may be no less than 0.1 mm, no less than 0.5 mm, no less than 1 mm, or no less than 1.5 mm. The distance between apexes 210 may be no greater than 1000 mm, no greater than 500 mm, no greater than 100 mm, no greater than 10 mm, or no greater than 5 mm. In a particular embodiment the distance between adjacent non-transparent elements 206 may be in a range between and including 0.2 mm and 0.3 mm and a distance between apexes of adjacent non-transparent elements 206 may be in a range between and including 1.5 mm and 1.6 mm.

Figure 5:
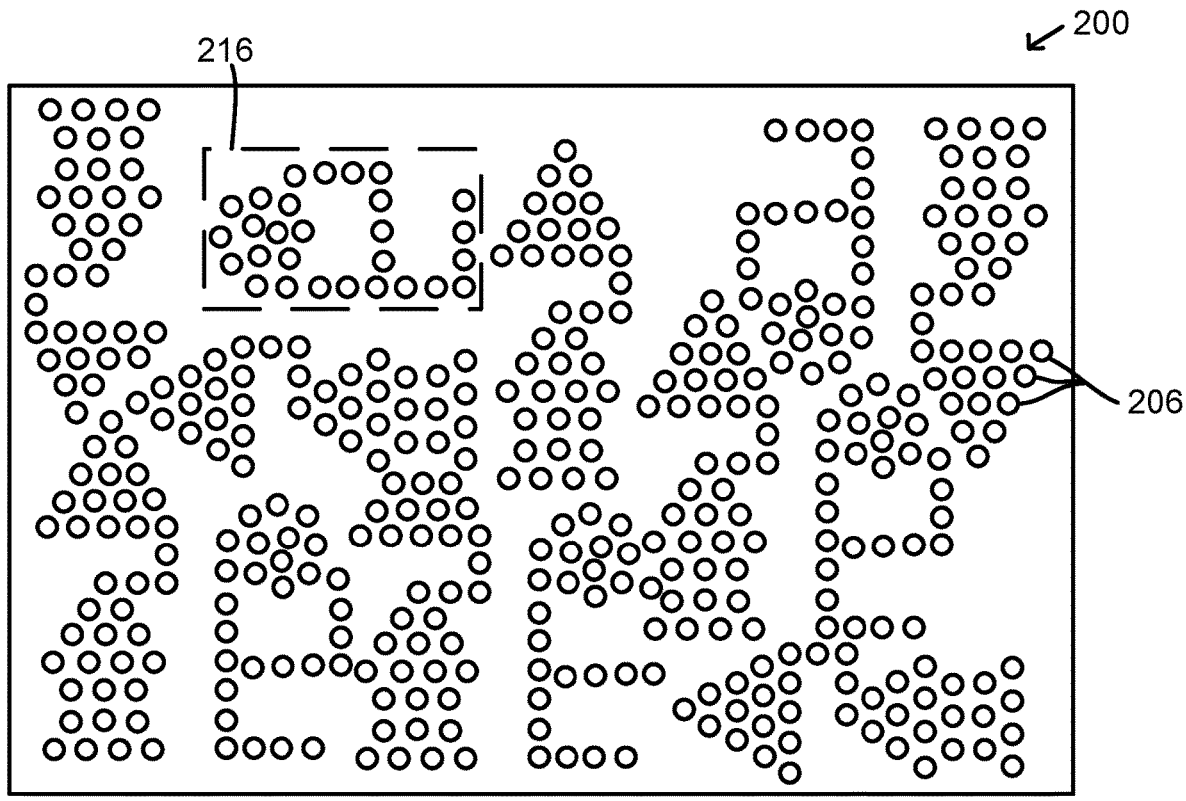
FIG. 5 includes a front view of another system in accordance with an embodiment.

Referring to FIG. 5, in certain embodiments it may be desirable to vary distances between adjacent non-transparent elements 206. For example, as the non-transparent elements 206 may alter appearance of incident light reflecting from the system 200, it may be possible to display indicia 216, such as logos, symbols, text, or other suitable images to an observer independent of a projected image. Thus, people passing by the system 200 may recognize indicia 216 from natural light reflectance. In a particular embodiment, at least one of the non-transparent elements 206 may include a pigment or a dye integrally mixed with the non-transparent element 206 or coated thereon. Combinations of pigments or dyes may be utilized in different combinations between the non-transparent elements 206 to change color, reflectivity, or appearance of the different non-transparent elements 206. Arrangement of the non-transparent elements 206 can thus be done to effectively display indicia 216. For example, logo colors can be accurately displayed, non-transparent element 206 density can be locally controlled, or reflectivity can be specifically adjusted to create a more accurate indicia.

Figure 6:
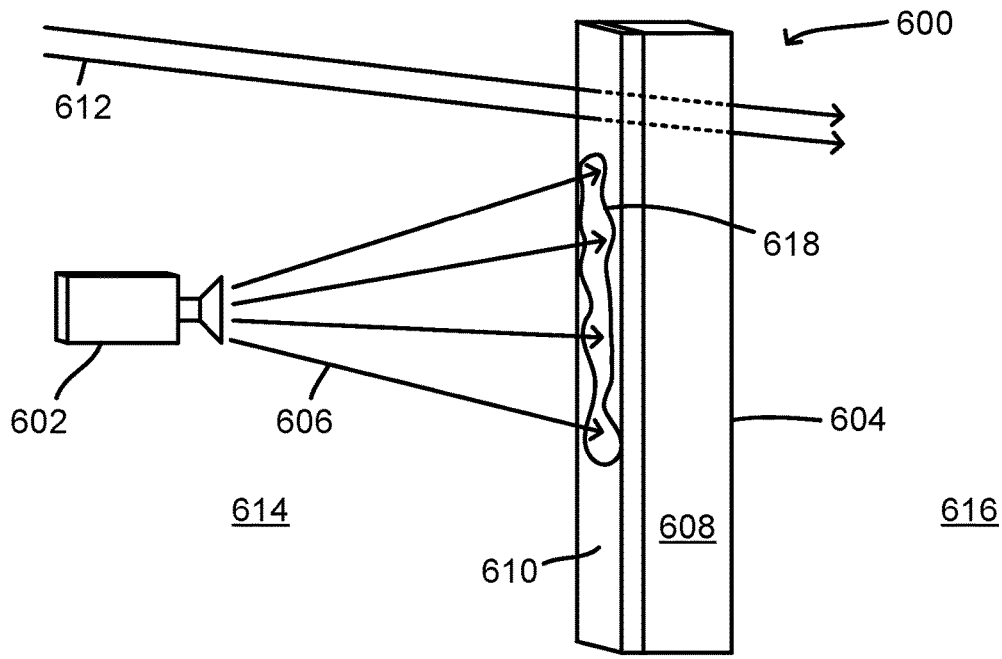
FIG. 6 includes a perspective view of a system including a unit and a light emitting source in accordance with an embodiment.

FIG. 6 illustrates a system 600 including a light emitting source 602 and a unit 604 onto which light 606 from the light emitting source 602 is projectable. The unit 604 can include a substrate 608 and a coating 610, where the coating includes a plurality of non-transparent elements (not illustrated) having any combination of similar features to the non-transparent elements 206 described above. Light 606 from the light emitting source 602 can interact with the coating 610 to display an image 608 on the unit 604. Ambient light 612, for example from an exterior region 614, can simultaneously be transmitted through the unit 604, illuminating, for example an interior region 616.

In an embodiment, the substrate 608 may include an electrochromic component adapted to selectively transition between bleached and tinted states. Regardless of electrochromic state, the coating 610 may display the image 618 along the unit 604. In such a manner, it may be desired to position the coating 610 on a same side of the electrochromic component as the light emitting source 602 such that the image 618 is displaying on the coating 610.

In an embodiment, the light emitting source 602 may include a gaseous source, an incandescent source, a luminescent source, or a combination thereof. In an embodiment, the light emitting source 602 may be disposed closer to the coating 610 than the substrate 608. In a particular embodiment, the light emitting source 602 may be disposed in the exterior region 614 of the system 600, projecting an image along the exterior surface of the unit 604.

Figure 7:
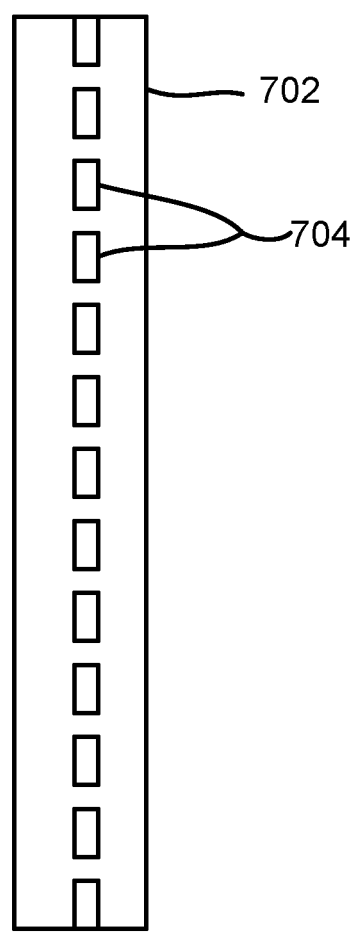
FIG. 7 includes a cross-sectional elevation view of a coating in accordance with an embodiment.

As illustrated in FIG. 6, the coating 610 is disposed along an exterior side of the unit 604. FIG. 7 illustrates a similar configuration where coating 610 is disposed along an interior side of the unit 604. While reversible, use of the coating 610 on the interior side of the unit 604 may refract light, causing glare and image distortion. In an non-illustrated embodiment, the coating 610 can also be disposed within the unit 604 such that it is at least partially, such as fully, embedded, for example, between two or more layers, sheets, or elements. For example, it may be possible to position the coating 610 along an internal surface of an insulated glass unit (IGU) where air exposure is mitigated.

In an embodiment, the system may include any further coatings, layers, materials, substrates, or laminated structures which change the operative properties of the system or provide additional desired benefits. In a particular embodiment, the system can further include a solar control layer, such as, for example, an ultraviolet light film. In another particular embodiment, the system can further include a self-cleaning layer, film, or structure which may be more readily cleanable than other materials (e.g., glass). The self-cleaning layer may be suitable, for example, along an exterior surface, or portions of exterior surfaces, of the system where environmental exposure may reduce visibility and visual quality.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the embodiments as listed below.

Embodiment 1

A glazing comprising:
an electrochromic component; and
a coating coupled to the electrochromic component, wherein the coating comprises a non-transparent element.

Embodiment 2

A method of displaying an image comprising:
providing an electrochromic component and a coating coupled to the electrochromic component; and
projecting the image onto the coating from a light emitting source.

Embodiment 3

A building comprising:
an electrochromic component disposed between an internal environment and an external environment of the building; and
a coating coupled to the electrochromic component, wherein the coating comprises a plurality of non-transparent elements disposed over at least 10% of a surface area of the electrochromic component.

Embodiment 4

A method of manufacturing a glazing comprising:
providing a glazing comprising an electrochromic component; and
attaching a coating to a major surface of the glazing, wherein the coating comprises a plurality of non-transparent elements.

Embodiment 5

The method of embodiment 4, wherein attaching the coating to the glazing is performed by an additive manufacturing process, wherein attaching the coating to the glazing is performed by printing, wherein attaching the coating to the glazing is performed by screen printing, wherein attaching the coating to the glazing is performed by sputtering with a shadow mask.

Embodiment 6

The glazing, method, or building of any one of the preceding embodiments, wherein the electrochromic component comprises:
an electrochromic layer;
a counter electrode layer; and
an ion conductive layer disposed between the electrochromic layer and the counter electrode layer.

Embodiment 7

The glazing, method, or building of any one of the preceding embodiments, wherein the coating comprises a non-transparent element, wherein the non-transparent element comprises a plurality of non-transparent elements, wherein at least two of the plurality of non-transparent elements have a same size, spectral property, or a combination thereon.

Embodiment 8

The glazing, method, or building of embodiment 7, wherein at least one of the plurality of non-transparent elements has an ellipsoidal shape when viewed perpendicular to a major surface of the electrochromic component, wherein at least one of the plurality of non-transparent elements has a polygonal shape when viewed perpendicular to the major surface.

Embodiment 9

The system, method, or building of any one of embodiments 7 and 8, wherein at least one of the plurality of non-transparent elements has a largest dimension, as measured parallel with a major surface of the electrochromic component, of at least 0.1 mm, at least 1 mm, at least 1.5 mm, at least 2 mm, or at least 3 mm, wherein at least one of the plurality of non-transparent elements has a largest dimension, as measured parallel with the major surface of the electrochromic component, of no greater than 20 mm, no greater than 10 mm, or no greater than 5 mm.

Embodiment 10

The system, method, or building of any one of the preceding embodiments, wherein the coating comprises a plurality of non-transparent elements arranged in a pattern, wherein the pattern comprises a honeycomb, wherein the pattern is speckled, wherein the pattern comprises an indicia, wherein the indicia is a logo, symbol, or other similar recognizable image.

Embodiment 11

The system, method, or building of any one of the preceding embodiments, wherein the coating comprises a ceramic, a metal, a polymer, or a combination thereof.

Embodiment 12

The system, method, or building of any one of the preceding embodiments, wherein the electrochromic component has a visible surface area, $A_{EC}$, and the coating covers at least 10% $A_{EC}$, at least 25% $A_{EC}$, at least 50% $A_{EC}$, at least 75% $A_{EC}$, or at least 90% $A_{EC}$.

Embodiment 13

A system comprising:
a unit comprising:
a transparent or translucent substrate; and
a coating coupled to the substrate; and
a light emitting source adapted to project an image toward the coating.

Embodiment 14

A method of displaying an image comprising:
providing a unit comprising a transparent or translucent substrate and a coating coupled to the substrate; and
projecting the image onto the coating from a light emitting source.

Embodiment 15

The system or method of any one of embodiments 13 and 14, wherein the substrate comprises an electrochromic glazing, wherein the substrate comprises a multi-piece construction, wherein the substrate comprises a laminate.

Embodiment 16

The system or method of any one of embodiments 2 and 13-15, wherein the light emitting source comprises a gaseous source, an incandescent source, a luminescent source, or a combination thereof.

Embodiment 17

The system or method of any one of embodiments 13-16, wherein the light emitting source is disposed closer to the coating than the substrate.

Embodiment 18

The system or method of any one of embodiments 13-17, wherein the image is visible on the unit while ambient spectral transmittance through the unit is at least 40%.

Embodiment 19

The system or method of any one of embodiments 13-18, wherein the coating comprises a non-transparent element, wherein the non-transparent element comprises a plurality of non-transparent elements, wherein at least two of the plurality of non-transparent elements have a same size, spectral property, or a combination thereof.

Embodiment 20

The system or method of embodiment 19, wherein at least one of the plurality of non-transparent elements has an ellipsoidal shape when viewed perpendicular to a major surface of the unit, wherein at least one of the plurality of non-transparent elements has a polygonal shape when viewed perpendicular to the unit.

Embodiment 21

The system or method of any one of embodiments 19 and 20, wherein at least one of the plurality of non-transparent elements has a largest dimension, as measured parallel with a major surface of the unit, of at least 0.1 mm, at least 1 mm, at least 1.5 mm, at least 2 mm, or at least 3 mm, wherein at least one of the plurality of non-transparent elements has a largest dimension, as measured parallel with the major surface of the unit, of no greater than 20 mm, no greater than 10 mm, or no greater than 5 mm.

Embodiment 22

The system or method of any one of embodiments 13-21, wherein the coating comprises a ceramic, a metal, a polymer, or a combination thereof.

Embodiment 23

The system or method of any one of embodiments 13-22, wherein the substrate has a visible surface area, $A_S$, and the coating covers at least 10% $A_S$, at least 25% $A_S$, at least 50% $A_S$, at least 75% $A_S$, or at least 90% $A_S$.

Embodiment 24

The system or method of any one of embodiments 13-23, wherein the unit comprises a window disposed between an internal environment and an external environment, and wherein the coating is disposed closer to the external environment than the internal environment.

Embodiment 25

The system or method of any one of embodiments 13-24, wherein the coating is applied to the substrate, wherein the coating applied to the substrate by an additive manufacturing process, wherein the coating is screen printed.

Embodiment 26

The system or method of any one of the preceding embodiments, wherein the coating, or portions of the coating, comprise a color, wherein the color comprises a non-white color such as black, red, blue, green, yellow, orange, violet, or wherein the color comprises a white color, or combinations thereof.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A glazing comprising:
    an electrochromic component, wherein the electrochromic component comprises:
        a first transparent conductive layer;
        a second transparent conductive layer;
        a counter electrode layer; and
        an electrochromic layer; and
    a coating coupled to the electrochromic component, wherein the coating comprises a transparent portion and a non-transparent portion, wherein the non-transparent portion is in direct contact with a substrate, and wherein:
        the coating is coupled to an exterior portion of the electrochromic component,
        the coating covers at least 10% of a surface area of the electrochromic component; or
        a combination thereof.

2. The glazing of claim 1, wherein the electrochromic component comprises:
    an electrochromic layer;
    a counter electrode layer; and
    an ion conductive layer disposed between the electrochromic layer and the counter electrode layer.

3. The glazing of claim 1, wherein the non-transparent portion comprises a plurality of non-transparent elements, wherein at least two of the plurality of non-transparent elements have a same size, spectral property, or a combination thereof.

4. The glazing of claim 3, wherein at least one of the plurality of non-transparent elements has an ellipsoidal shape when viewed perpendicular to a major surface of the electrochromic component, wherein at least one of the plurality of non-transparent elements has a polygonal shape when viewed perpendicular to the major surface.

5. The glazing of claim 1, wherein the coating comprises a plurality of non-transparent elements arranged in a pattern.

6. The glazing of claim 1, wherein the coating comprises a ceramic, a metal, a polymer, or a combination thereof.

7. The glazing of claim 1, wherein the electrochromic component has a visible surface area, $A_{EC}$, and the coating covers at least 10% $A_{EC}$.

8. A system comprising:
    a unit comprising:
        an electrochromic component, wherein the electrochromic component comprises:
            a first transparent conductive layer;
            a second transparent conductive layer;
            a counter electrode layer; and
            an electrochromic layer;
        a transparent or translucent substrate, wherein the electrochromic component is on the substrate; and
        a coating coupled to the substrate, the coating comprising a transparent portion and a non-transparent portion, wherein the coating covers at least 25% of a surface area of the electrochromic component, and wherein the non-transparent portion is in direct contact with the substrate; and
    a light emitting source adapted to project an image toward the coating.

9. The system of claim 8, wherein the substrate comprises an electrochromic glazing, wherein the substrate comprises a multi-piece construction, wherein the substrate comprises a laminate.

10. The system of claim 8, wherein the light emitting source comprises a gaseous source, an incandescent source, a luminescent source, or a combination thereof.

11. The system of claim 8, wherein the light emitting source is disposed closer to the coating than the substrate.

12. The system of claim 8, wherein the image is visible on the unit while ambient spectral transmittance through the unit is at least 40%.

13. The system of claim 8, wherein the non-transparent portion comprises a plurality of non-transparent elements, wherein at least two of the plurality of non-transparent elements have a same size, spectral property, or a combination thereof.

14. The system of claim 13, wherein at least one of the plurality of non-transparent elements has a largest dimension, as measured parallel with a major surface of the unit, of at least 0.1 mm.

15. The system of claim 13, wherein the coating comprises a ceramic, a metal, a polymer, or a combination thereof.

16. The system of claim 13, wherein the substrate has a visible surface area, $A_S$, and the coating covers at least 10% $A_S$.

17. The system of claim 13, wherein the unit comprises a window disposed between an internal environment and an external environment, and wherein the coating is disposed closer to the external environment than the internal environment.

18. A method of displaying an image comprising:
    providing an electrochromic component and a coating coupled to the electrochromic component, wherein the coating comprises a transparent portion and a non-transparent portion, wherein the coating covers at least 25% of a surface area of the electrochromic component, and wherein the non-transparent portion is in direct contact with a substrate; and
    projecting the image onto the coating from a light emitting source.

19. The method of claim 18, wherein a glazing comprises the electrochromic component, the coating is attached to a major surface of the glazing, and the coating comprises a plurality of non-transparent elements.

20. The method of claim 19, wherein attaching the coating to the glazing is performed by an additive manufacturing process, by printing, by screen printing, by sputtering with a shadow mask, or any combination thereof.

* * * * *